US012331878B2

(12) United States Patent
Li

(10) Patent No.: US 12,331,878 B2
(45) Date of Patent: Jun. 17, 2025

(54) ELECTRIC DOUBLE-ROD GREASE GUN

(71) Applicant: Zhejiang Suoli Industry and Trade Co., Ltd., Lishui (CN)

(72) Inventor: Liping Li, Yongkang (CN)

(73) Assignee: Zhejiang Suoli Industry and Trade Co., Ltd., Lishui (CN)

( * ) Notice: Subject to any disclaimer, the term of this patent is extended or adjusted under 35 U.S.C. 154(b) by 0 days.

(21) Appl. No.: 18/649,548

(22) Filed: Apr. 29, 2024

(65) Prior Publication Data
US 2024/0392917 A1     Nov. 28, 2024

(30) Foreign Application Priority Data

May 22, 2023   (CN) .......................... 202321248536.6

(51) Int. Cl.
*F16N 13/06*    (2006.01)
*F16N 3/12*     (2006.01)

(52) U.S. Cl.
CPC .............. *F16N 13/06* (2013.01); *F16N 3/12* (2013.01); *F16N 2013/063* (2013.01)

(58) Field of Classification Search
CPC ..... F16N 3/02; F16N 3/06; F16N 3/10; F16N 3/12; F16N 13/02; F16N 13/14; F16H 57/0464; F04B 19/22; F04B 23/028
See application file for complete search history.

(56) References Cited

U.S. PATENT DOCUMENTS

2008/0047980 A1*  2/2008  Huang ...................... F16N 3/12
                                                               222/263
2009/0227411 A1*  9/2009  Guo ......................... F16N 3/12
                                                               475/150
2018/0030966 A1*  2/2018  Wang .................... F04B 23/028

FOREIGN PATENT DOCUMENTS

CN    218268469 U       1/2023
FR    2934664 A3  *     2/2010     ............ F16N 13/10

* cited by examiner

*Primary Examiner* — Minh Truong
(74) *Attorney, Agent, or Firm* — Birchwood IP

(57) ABSTRACT

An electric double-rod grease gun is provided, which includes an oil storage tank, a plunger pump, and a driving device; the plunger pump includes a pump body that is provided with a first plunger chamber and a second plunger chamber, both the first plunger chamber and second plunger chamber are respectively provided with a first plunger rod and a second plunger rod; the driving device includes a driving motor, a reduction mechanism, a main transmission gear, a first secondary transmission gear, a second secondary transmission gear, a first eccentric shaft, a second eccentric shaft, a first connection rod, and a second connection rod. The first secondary transmission gear and the second secondary transmission gear are all meshed with the main transmission gear grease.

15 Claims, 8 Drawing Sheets

ELECTRIC DOUBLE-ROD GREASE GUN

CROSS-REFERENCE TO RELATED APPLICATIONS

This application claims priority to Chinese Patent Application No. 202321248536.6, filed on May 22, 2023, which is hereby incorporated by reference in its entirety.

TECHNICAL FIELD

The present disclosure relates to the field of lubricating grease filling device technologies, and in particular, to an improved electric double-rod grease gun.

BACKGROUND

The applicant previously filed an electric double-rod grease (CN218268469U), which includes an oil storage tank, a plunger pump, and a driving device; the plunger pump body is equipped with a first plunger chamber and a second plunger chamber that are connected to the oil storage tank and arranged in parallel up and down. The first plunger chamber and the second plunger chamber are slidably sleeved with a first plunger rod and a second plunger rod, respectively. The driving device includes a driving motor, a reduction mechanism, a first transmission gear, a second transmission gear, a first eccentric shaft, a second eccentric shaft, a first slider, and a second slider.

During operation, high-speed rotational motion of the driving motor is reduced by the reduction mechanism, which drives the first transmission gear to rotate, and the second transmission gear rotates accordingly. The rotational motion of the second transmission gear is matched with the transmission of the first eccentric shaft and second eccentric shaft and the first slider and second slider, and the first plunger rod and second plunger rod are driven to perform asynchronous linear motion in the first plunger chamber and second plunger chamber respectively. That is, when the first plunger rod moves outward to achieve oil suction action, the second plunger rod moves inward to achieve oil pushing action. Conversely, when the first plunger rod moves inward to achieve oil pushing action, the second plunger rod moves outward to achieve oil suction action, thereby an oil injection work of the electric grease gun is achieved.

This electric double-rod grease gun can improve an oil injection efficiency compared to the traditional grease gun with a single plunger rod structure. However, the first plunger chamber and second plunger chamber of this electric double-rod grease gun are arranged parallel to each other in the plunger pump body. As a result, a distance between oil inlets of the two plunger chambers and an oil outlet of the oil storage tank is actually different, which results in that the oil injection efficiency of the first plunger chamber located at an upper is much lower than that of the second plunger chamber located at a lower during operation, which still affects a final oil injection efficiency of the electric double-rod grease gun in some extent. Therefore, an improvement is needed.

SUMMARY

The purpose of the present disclosure is to overcome the shortcomings of the prior art and provide an improved electric double-rod grease gun with high oil injection efficiency, a more reasonable and reliable structure.

The purpose of the present disclosure is achieved through the following technical solutions.

An improved electric double-rod grease gun includes an oil storage tank, a plunger pump, and a driving device; the plunger pump includes a pump body connected to the oil storage tank, the pump body is provided with a first plunger chamber and a second plunger chamber arranged parallelly to the oil storage tank in a horizontal direction; the first plunger chamber is slidably sleeved with a first plunger rod, the second plunger chamber is slidably sleeved with a second plunger rod, and the pump body is further provided with an oil outlet nozzle connected to the first plunger chamber and the second plunger chamber; the driving device includes a driving motor, a reduction mechanism, a main transmission gear, a first secondary transmission gear, a second secondary transmission gear, a first eccentric shaft, a second eccentric shaft, a first connection rod, and a second connection rod; the driving motor drives the main transmission gear through the reduction mechanism, and both the first secondary transmission gear and second secondary transmission gear are meshed with the main transmission gear; the first eccentric shaft is eccentrically provided on the first secondary transmission gear, the second eccentric shaft is eccentrically provided on the second secondary transmission gear; one end of the first connection rod is movably connected to the first eccentric shaft, and the other end thereof is movably connected to the first plunger rod; one end of the second connection rod is movably connected to the second eccentric shaft, and the other end thereof is movably connected to the second plunger rod.

In an embodiment of the present disclosure, the first secondary transmission gear and the second secondary transmission gear are symmetrically provided on one side of the main transmission gear away from an axis of the oil storage tank, the first eccentric shaft is eccentrically arranged on an upper end face of the first transmission gear, the second eccentric shaft is eccentrically provided on an upper end face of the second secondary transmission gear that is on one side opposite to the first eccentric shaft.

In an embodiment of the present disclosure, the main transmission gear, the first secondary transmission gear, and the second secondary transmission gear are provided on the same horizontal plane.

In an embodiment of the present disclosure, a lower of the pump body is provided with an oil inlet chamber connected to an oil outlet of the oil storage tank, and the first plunger chamber is provided with a first oil inlet connected to the oil inlet chamber; the second plunger chamber is provided with a second oil inlet connected to the oil inlet chamber, the first oil inlet and the second oil inlet are on the same horizontal plane, the first oil inlet and the second oil inlet are also connected via an oil inlet groove that is communicated to the oil inlet chamber.

In an embodiment of the present disclosure, the driving motor, the reduction mechanism, and the main transmission gear are sequentially arranged from bottom to top, and the three are on the same central axis.

In an embodiment of the present disclosure, one end of the first connection rod is provided with a first connecting hole for connection with the first eccentric shaft, the other end thereof is provided with a first opening groove for connection with the first plunger rod; the first connecting hole is movably wrapped around the first eccentric shaft, the first opening groove is wrapped around an outer of the first plunger rod and connected to the first plunger rod through a first pin shaft; one end of the second connection rod is provided with a second connecting hole for connection with the second eccentric shaft, the other end thereof is provided with a second opening groove for connection with the second plunger rod; the second connecting hole is wrapped around the second eccentric shaft, the second opening groove is wrapped around an outer of the second plunger rod and connected to the second plunger rod through a second pin shaft.

In an embodiment of the present disclosure, the pump body includes a main body fixedly connected to the oil storage tank and an extension portion extending from the main body towards a direction of the driving device; a first accommodation chamber with an upward opening is formed in an upper of the extension portion, the main transmission gear, the first secondary transmission gear, and the second secondary transmission gear are respectively provided in the first accommodation chamber, the opening of the first accommodation chamber is provided with a detachable upper cover; a second accommodation chamber with a downward opening is formed in a lower of the extension portion, a communication hole is provided between the second accommodation chamber and the first accommodation chamber; the second accommodation chamber is configured to accommodate an output end of the reduction mechanism, the output end of the reduction mechanism is connected to a main transmission gear shaft; an upper of the main transmission gear shaft passes through the communication hole and extends into the first accommodation chamber to connect with the main transmission gear, a first bearing is provided between the main transmission gear shaft and the communication hole.

In an embodiment of the present disclosure, the first secondary transmission gear and second secondary transmission gear are respectively connected to a first transmission gear shaft and a second transmission gear shaft; a bottom wall of the first accommodation chamber is concavely provided with a first accommodation groove for accommodating the first secondary transmission gear shaft and a second accommodation groove for accommodating the second secondary transmission gear shaft; a first upper bearing and a first lower bearing are provided between the first secondary transmission gear shaft and the first accommodation groove, and a second upper bearing and a second lower bearing are provided between the second secondary transmission gear shaft and the second accommodation groove.

In an embodiment of the present disclosure, the reduction mechanism includes a gear ring, a first sun gear, three first planetary gears, a first planetary gear carrier, a second sun gear, three second planetary gears, and a second planetary gear carrier; the first sun gear is fixedly connected to an output shaft of the driving motor; the three first planetary gears are rotatably installed at a lower of the first planetary gear carrier in a circular array, inner sides of the three first planetary gears are meshed with the first sun gear, outer sides of the three first planetary gears are meshed with a lower inner circumference of the gear ring; the second sun gear is rotatably installed in a center of an upper of the first planetary gear carrier, the three second planetary gears are rotatably installed at a lower of the second planetary gear carrier in a circular array; inner sides of the three second planetary gears are meshed with the second sun gear, outer sides of the three second planetary gears are meshed with an upper inner circumference of the gear ring; the second planetary gear carrier is embedded in the second accommodation chamber, a second bearing is provided between the second planetary gear carrier and the second accommodation chamber; a lower of the main transmission gear shaft is connected to the second planetary gear carrier.

In an embodiment of the present disclosure, the reduction mechanism further includes a box body, and the gear ring is embedded in the box bod; a plurality of first screw hole columns are provided on an outer circumference wall of the box body, and a plurality of second screw hole columns are provided on a lower outer circumference wall of the extension portion, each first screw hole column corresponds to each second screw hole column and they are fixedly connected by a screw.

Compared with existing technology, the present disclosure has the following beneficial effects.

Firstly, in the present disclosure, the first plunger chamber and the second plunger chamber are arranged parallelly in the plunger pump body in a horizontal direction, so it can be ensured that a distance between oil inlets of the two plunger chambers and an oil outlet of in the oil storage tank is consistent, and the oil inlets of the two plunger chambers are arranged close to the oil outlet of the oil storage tank, thereby ensuring that the oil inlet efficiency of the two plunger chambers are similar, and further improving the oil injection efficiency of the electric double-rod grease gun.

Secondly, the present disclosure designs a new driving device for the first plunger rod and second first plunger rod that are slidably sleeved in the first and second plunger chambers arranged parallelly to the horizontal direction. The driving device has the advantages of reasonable structure, smooth transmission, reliable operation, long service life, and convenient installation and maintenance.

DESCRIPTION OF EMBODIMENTS

Figure 1:
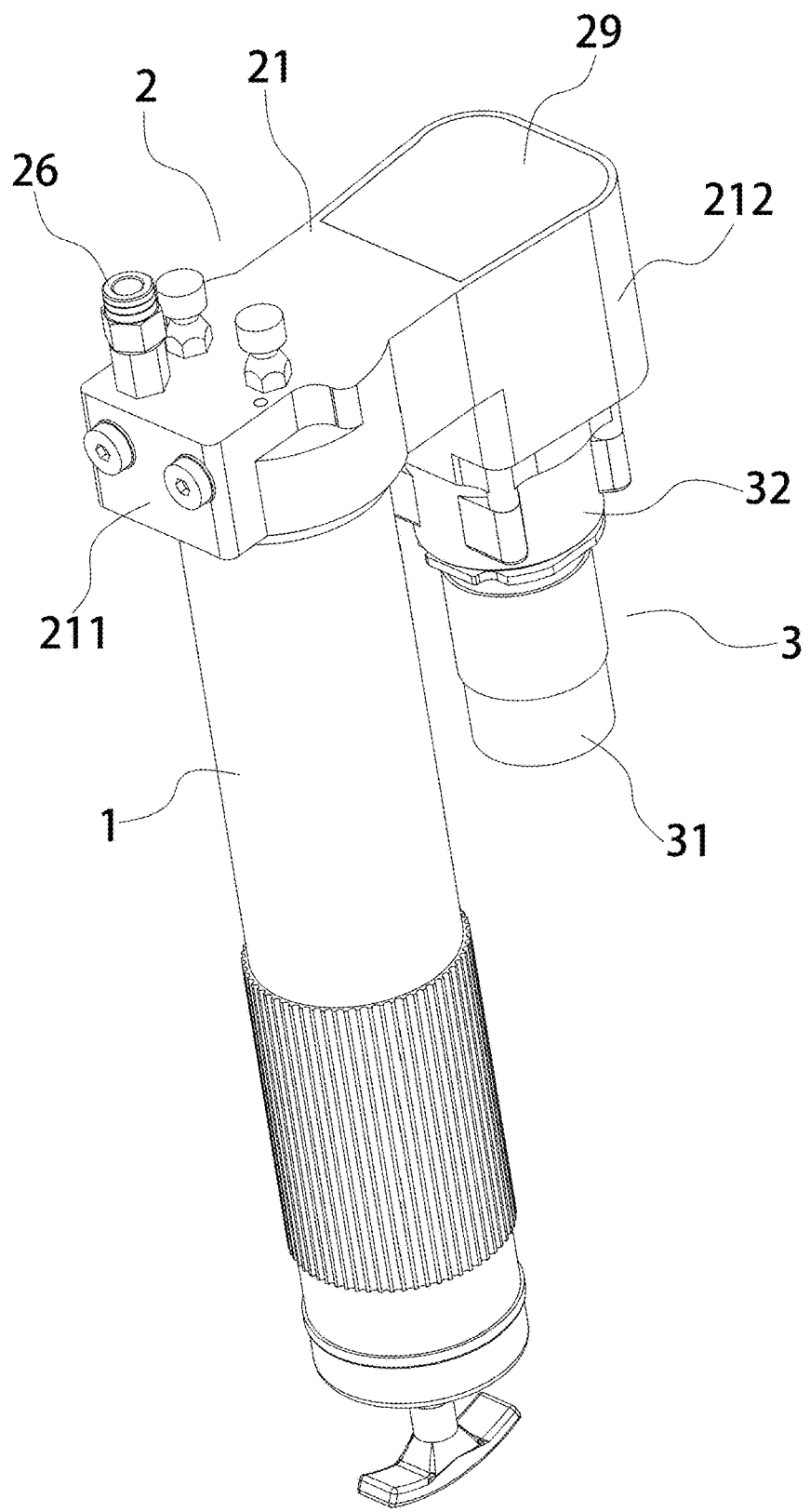
FIG. 1 is a three-dimensional schematic diagram of an improved electric double-rod grease gun of the present disclosure.

The following will provide a further detailed explanation of the present disclosure in combination with the embodiments provided in the drawings.

Figure 2:
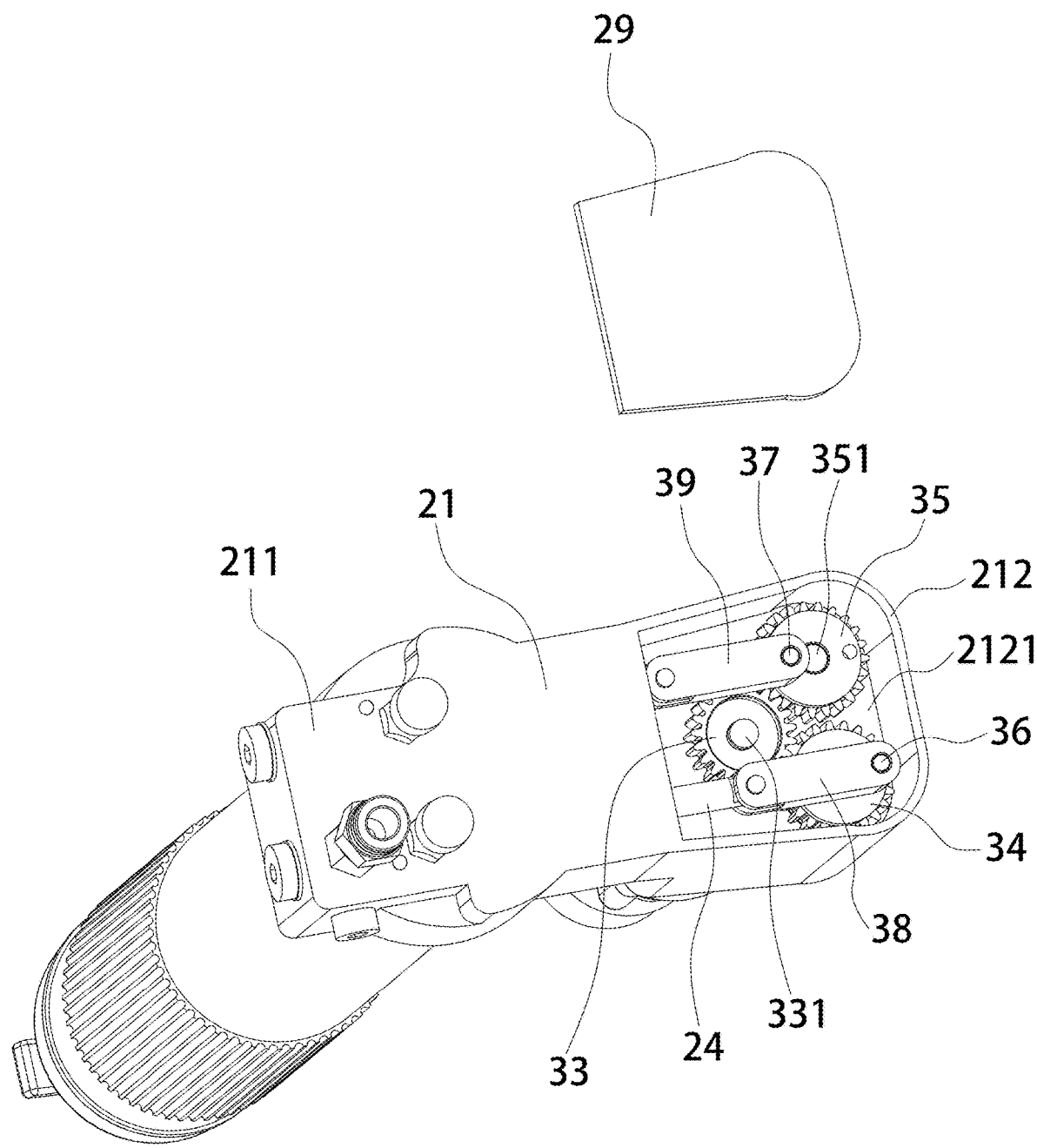
FIG. 2 is a first disassembly schematic diagram of the improved electric double-rod grease gun of the present disclosure.
Figure 3:
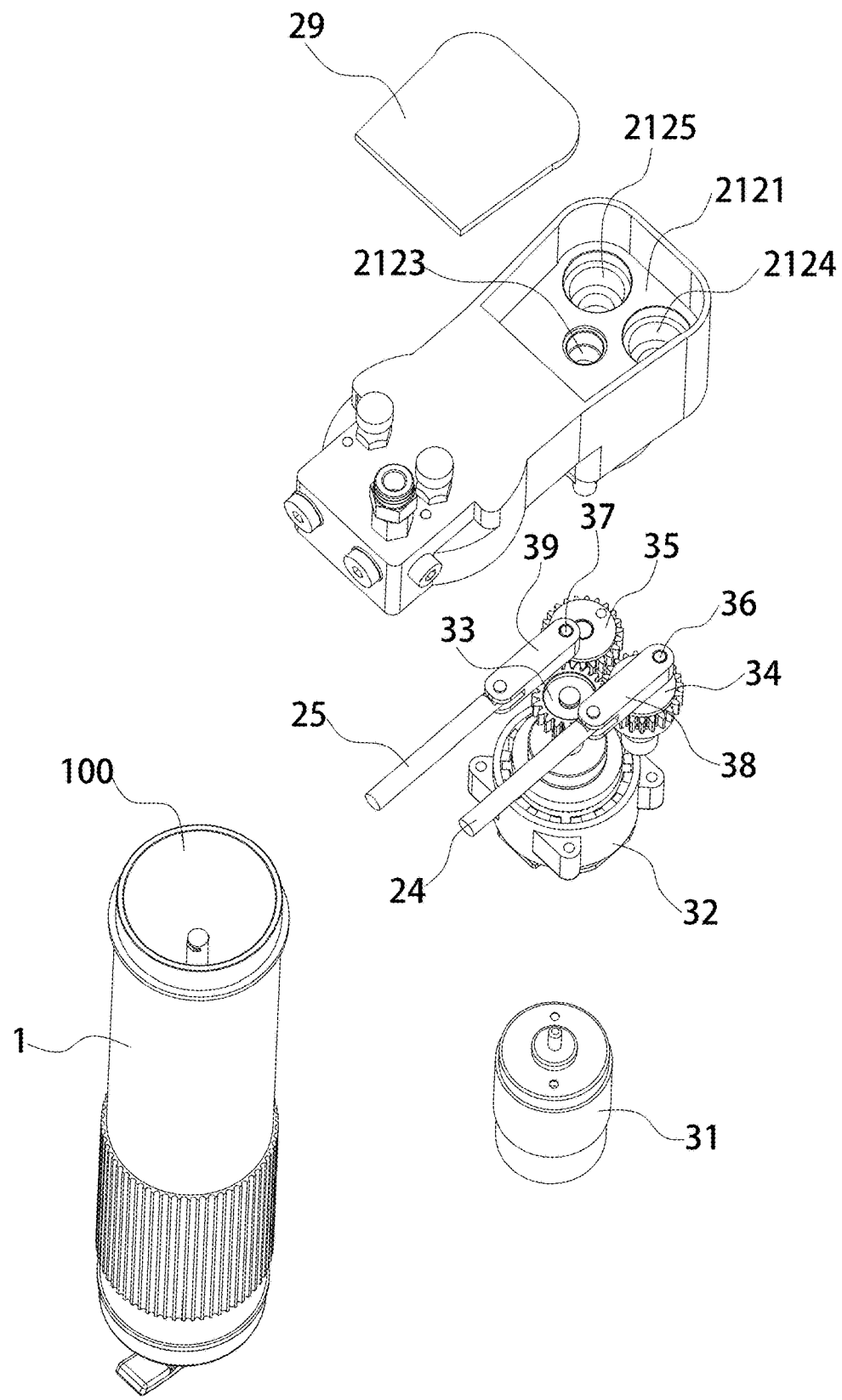
FIG. 3 is a second disassembly schematic diagram of the improved electric double-rod grease gun of the present disclosure.
Figure 4:
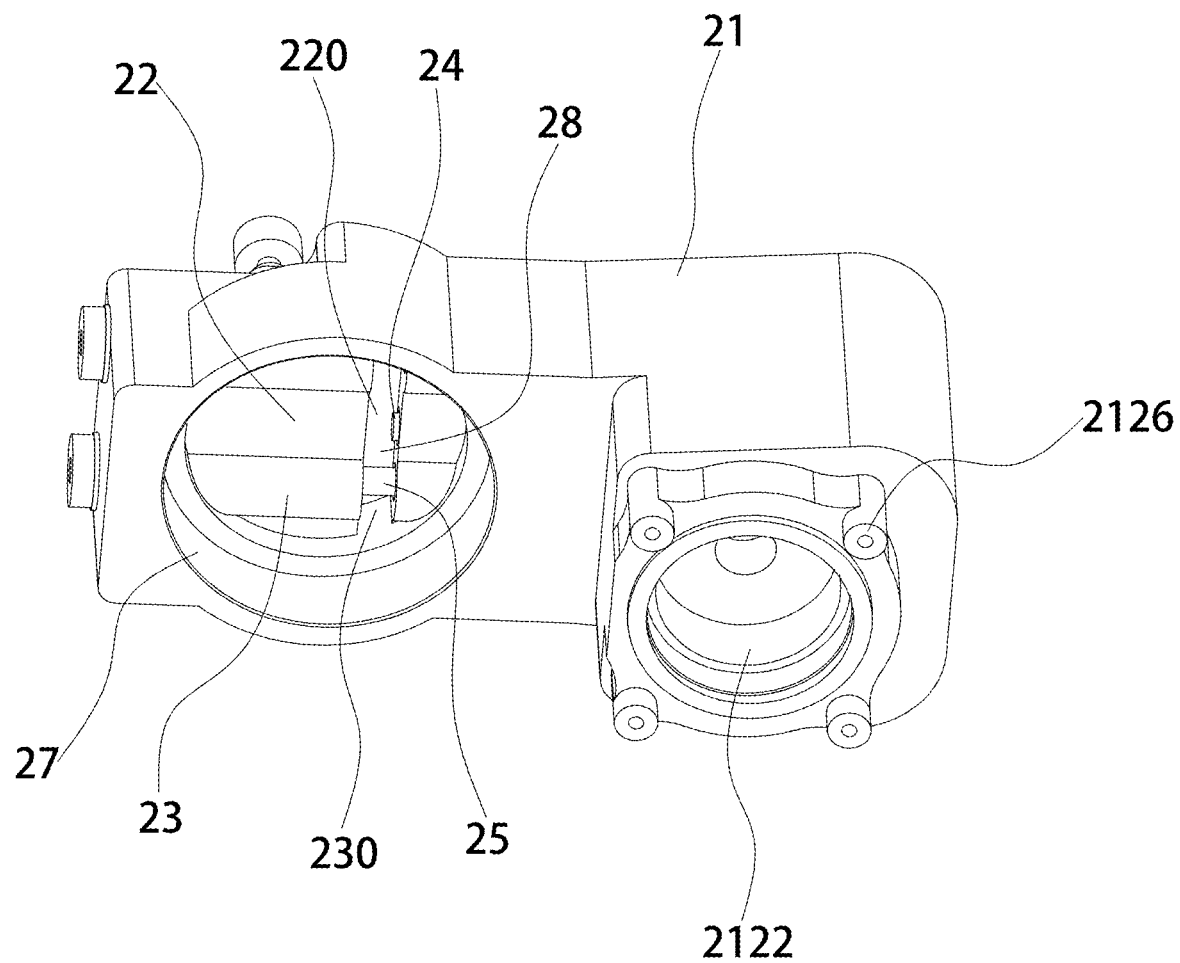
FIG. 4 is a top-down three-dimensional schematic diagram of a plunger pump in the present disclosure.
Figure 5:
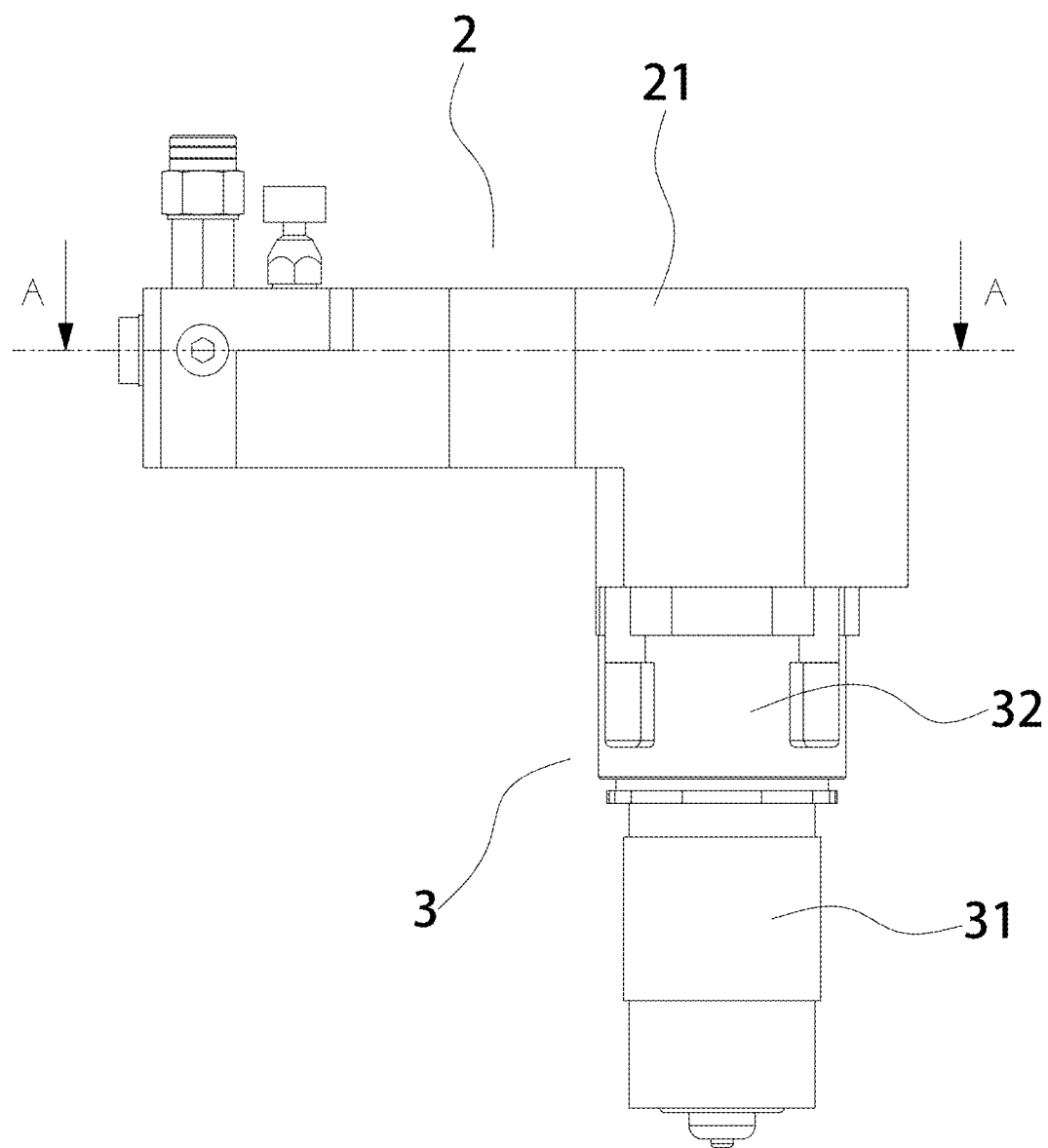
FIG. 5 is a schematic diagram of a front view of the plunger pump and a driving device in the present disclosure.
Figure 6:
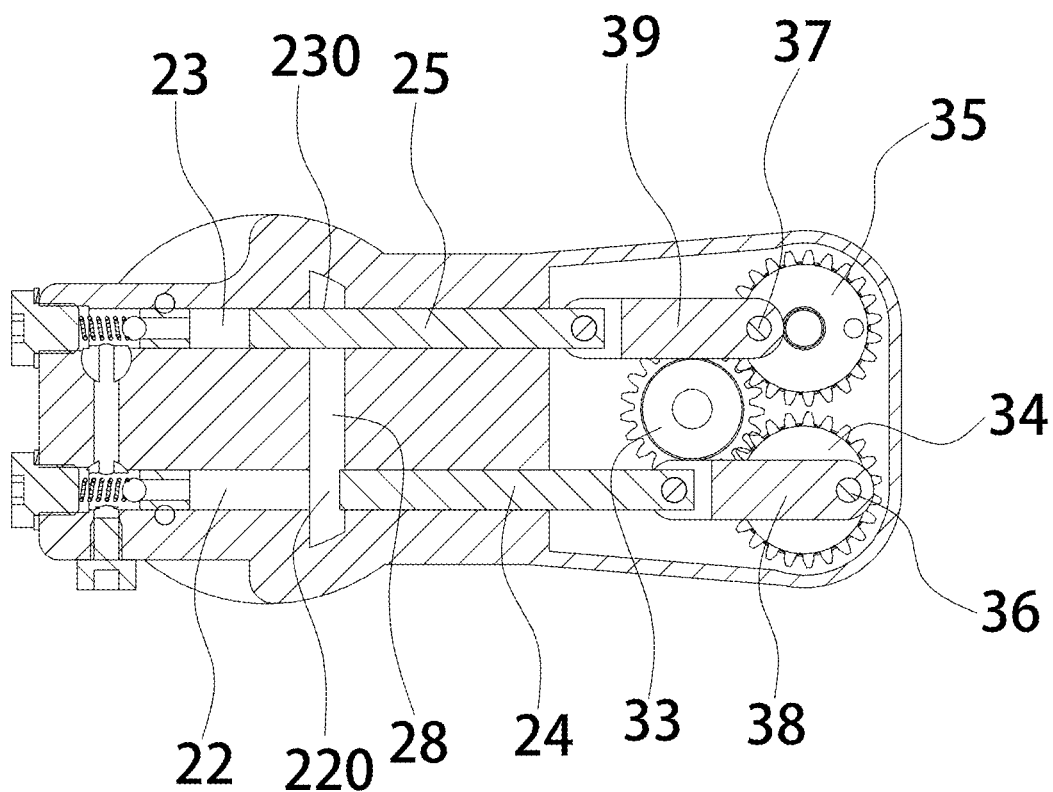
FIG. 6 is a sectional schematic diagram of A-A in FIG. 5.
Figure 7:
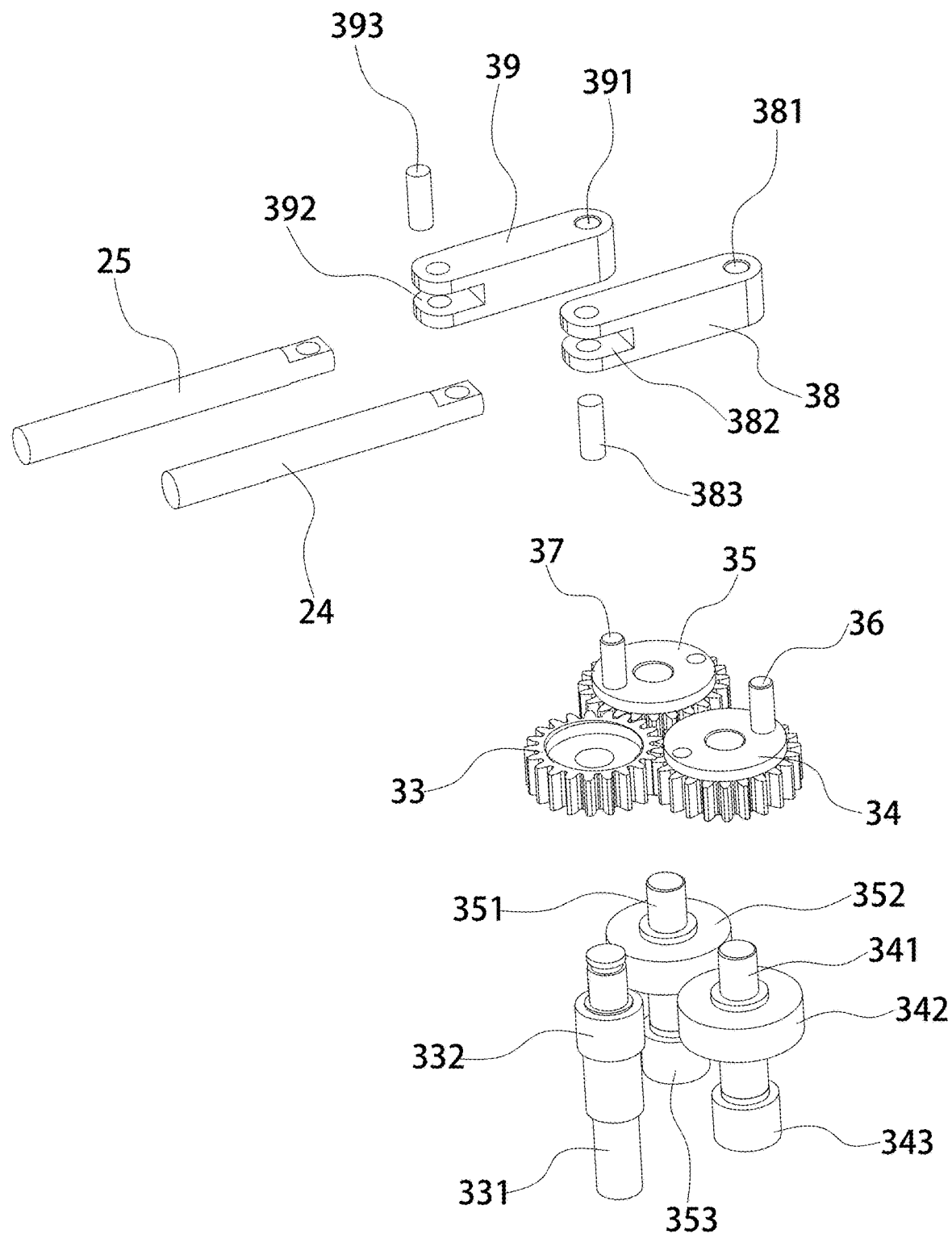
FIG. 7 is a decomposition structure schematic diagram of a part of the driving device in the present disclosure.
Figure 8:
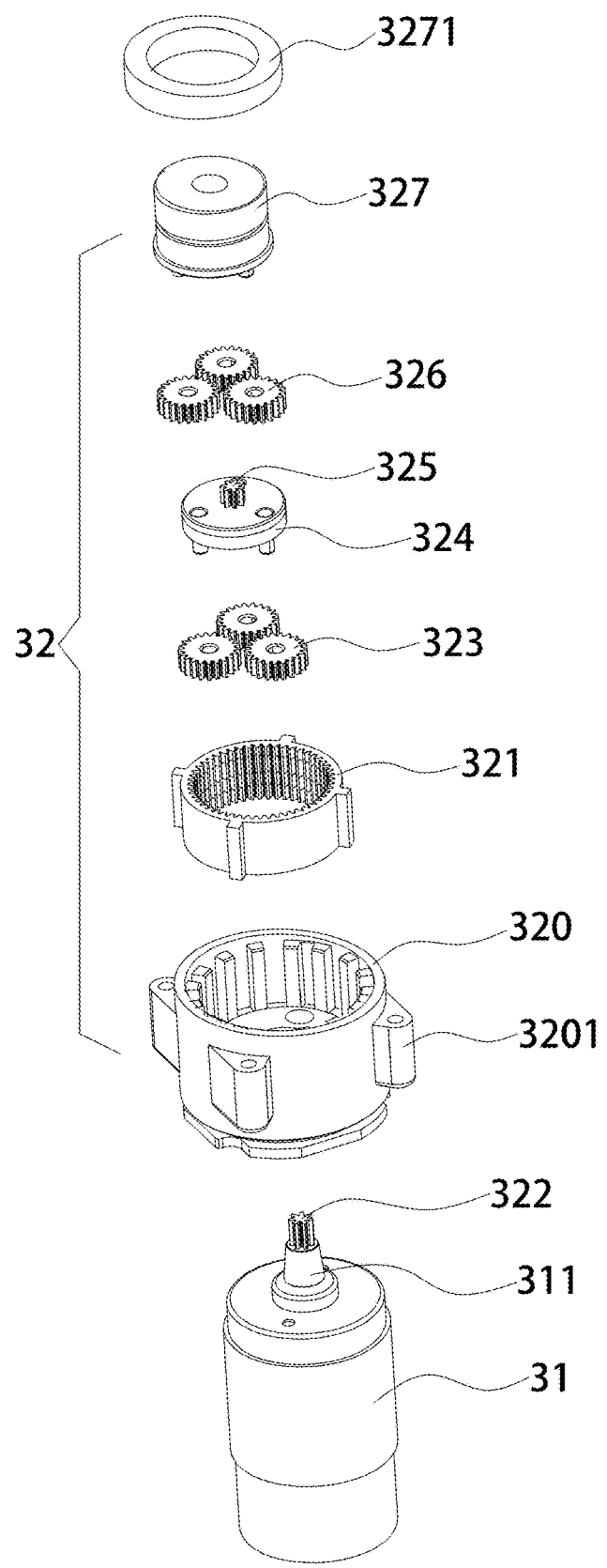
FIG. 8 is a decomposition structure schematic diagram of another part of the driving device in the present disclosure.

As shown in FIGS. 1 to 8, an improved electric double-rod grease gun according to the present disclosure includes an oil storage tank 1, a plunger pump 2, and a driving device 3. The plunger pump 2 includes a pump body 21 connected to the oil storage tank 1, which is provided with a first plunger chamber 22 and a second plunger chamber 23 that are connected to the oil storage tank 1 and arranged parallelly in a horizontal direction. The first plunger chamber 22 is slidably sleeved with a first plunger rod 24, the second plunger chamber 23 is slidably sleeved with a second plunger rod 25. The pump body 21 is further provided with an oil outlet nozzle 26 that is connected to the first plunger chamber 22 and the second plunger chamber 23. The driving device 3 includes a driving motor 31, a reduction mechanism 32, a main transmission gear 33, a first secondary transmission gear 34, a second secondary transmission gear 35, a first eccentric shaft 36, a second eccentric shaft 37, a first connection rod 38, and a second connection rod 39. The driving motor 31 drives the main transmission gear 33 through the reduction mechanism 32, both the first secondary transmission gear 34 and the second secondary transmission gear 35 are meshed with the main transmission gear 33. The first eccentric shaft 36 is eccentrically provided on the first secondary transmission gear 34, the second eccentric shaft 37 is eccentrically provided on the second secondary transmission gear 35. One end of the first connection rod 38 is movably connected to the first eccentric shaft 36, the other end thereof is movably connected to the first plunger rod 24, one end of the second connection rod 39 is movably connected to the second eccentric shaft 37, and the other end thereof is movably connected to the second plunger rod 25.

During operation, high-speed rotational motion of the driving motor 31 is reduced by the reduction mechanism 32, which drives the main transmission gear 33 to rotate. The first secondary transmission gear 34 and second secondary transmission gear 35 rotate accordingly, and the first connection rods 38 and second connection rod 39 are respectively driven to rotate by the first eccentric shaft 36 and the second eccentric shaft 37. The rotation of the first connection rod 38 and the second connection rod 39 drives the first plunger rod 24 and the second plunger rod 25 to perform linear reciprocating motion respectively in the first plunger chamber 22 and the second plunger chamber 23, thereby achieving "oil suction" and "oil pushing" actions, that is, oil and grease in the oil storage tank 1 are sucked into the first plunger chamber 22 and the second plunger chamber 23 respectively, and the first plunger chamber 22 and the second plunger chamber 23 are formed, respectively. The second plunger chamber 23 is pushed out to the oil outlet nozzle 26, which is connected to the oil-injection device, thereby achieving oil injection operation of the electric double-rod grease gun.

In an embodiment of the present disclosure, the first secondary transmission gear 34 and the second secondary transmission gear 35 are symmetrically arranged on one side of the main transmission gear 33 away from an axis of the oil storage tank 1. The first eccentric shaft 36 is eccentrically provided on an upper end face of the first secondary transmission gear 34, and the second eccentric shaft 37 is eccentrically provided on an upper end face of the second secondary transmission gear 35 on one side that is opposite to the first eccentric shaft 36. Therefore, when the first secondary transmission gear 34 and the second secondary transmission gear 35 are rotated by the main transmission gear 33, the first connection rod 38 and the second connection rod 39 can respectively drive the first plunger rod 24 and the second plunger rod 25 to perform asynchronous linear reciprocating motion in the first plunger chamber 22 and the second plunger chamber 23, respectively. When the first plunger rod 24 moves outward to achieve oil suction action, the second plunger rod 25 moves inward to achieve oil pushing action. Conversely, when the first plunger rod 24 moves inward to achieve oil pushing action, the second plunger rod 25 moves outward to achieve oil suction action. This design can effectively improve the oil injection efficiency of the electric double-rod grease gun.

In an embodiment of the present disclosure, the main transmission gear 33, the first secondary transmission gear 34, and the second secondary transmission gear 35 are provided on the same horizontal plane, which can save space and ensure the smoothness and reliability of gear transmission.

In an embodiment of the present disclosure, a lower of the pump body 21 is provided with an oil inlet chamber 27 connected to an oil outlet 100 of the oil storage tank 1, the first plunger chamber 22 is provided with a first oil inlet 220 connected to the oil inlet chamber 27, and the second plunger chamber 23 is provided with a second oil inlet 230 connected to the oil inlet chamber 27. The first oil inlet 220 and the second oil inlet 230 are on the same horizontal plane, the first oil inlet 220 and the second oil inlet 230 are also connected via an oil inlet groove 28 that is communicated to the oil inlet chamber 27. This design can increase oil intake of the first plunger chamber 22 and the second plunger chamber 23.

In an embodiment of the present disclosure, the driving motor 31, the reduction mechanism 32, and the main transmission gear 33 are sequentially arranged from bottom to top, and the three are on the same central axis, which can also save space and render the product structure compact and small.

In an embodiment of the present disclosure, one end of the first connection rod 38 is provided with a first connecting hole 381 for connection with the first eccentric shaft 36, and the other end thereof is provided with a first opening groove 382 for connection with the first plunger rod 24. The first connecting hole 381 is movably wrapped around the first eccentric shaft 36, the first opening groove 382 is wrapped around an outer of the first plunger rod 24 and connected to the first plunger rod through a first pin shaft 383; one end of the second connection rod 39 is provided with a second connecting hole 391 for connection with the second eccentric shaft 37, and the other end thereof is provided with a second opening groove 392 for connection with the second plunger rod 25. The second connecting hole 391 is movably wrapped around the second eccentric shaft 37, and the second opening groove 392 is movably wrapped around an outer of the second plunger rod 25 and connected to the second plunger rod 25 through a second pin shaft 393.

As mentioned above, the pump body 21 includes a main body 211 fixedly connected to the oil storage tank 1 and an extension portion 212 extending from the main body 211 towards a direction of the driving device 3. An upper of the extension portion 212 is formed with a first accommodation chamber 2121 with an upward opening. The main transmission gear 33, the first secondary transmission gear 34, and the second secondary transmission gear 35 are all provided in the first accommodation chamber 2121, the opening of the first accommodation chamber 2121 is provided with a detachable upper cover 29 to facilitate an installation and maintenance of internal components. A lower of the extension portion 212 is formed with a second accommodation chamber 2122 with a downward opening, a connecting hole 2123 is provided between the second accommodation chamber 2122 and the first accommodation chamber 2121, and the second accommodation chamber 2122 is configured to accommodate an output end of the reduction mechanism 32. The output end of the reduction mechanism 32 is connected to a main transmission gear shaft 331, and an upper of the main transmission gear shaft 331 passes through the connecting hole 2123 and extends into the first accommodation chamber 2121 to connect with the main transmission gear 33. A first bearing 332 is provided between the main transmission gear shaft 331 and the connecting hole 2123.

As mentioned above, the first secondary transmission gear 34 and the second secondary transmission gear 35 are respectively connected to a first secondary transmission gear shaft 341 and a second secondary transmission gear shaft 351. A bottom wall of the first accommodation chamber 2121 is concavely provided with a first accommodation groove 2124 for accommodating the first secondary transmission gear shaft 341 and a second accommodation groove 2125 for accommodating the second secondary transmission gear shaft 351; a first upper bearing 342 and a first lower bearing 343 are provided between the first secondary transmission gear shaft 341 and the first accommodation groove 2124, and a second upper bearing 352 and a second lower bearing 353 are provided between the second secondary transmission gear shaft 351 and the second accommodation groove 2125.

As mentioned above, the reduction mechanism 32 includes a gear ring 321, a first sun gear 322, three first planetary gears 323, a first planetary gear carrier 324, a second sun gear 325, three second planetary gears 326, and a second planetary gear carrier 327. The first sun gear 322 is fixedly connected to an output shaft 311 of the drive motor 31, and the three first planetary gears 323 are rotatably installed at a lower of the first planetary gear carrier 324 in a circular array. Inner sides of the three first planetary gears 323 are meshed with the first sun gear 322, outer sides of the three first planetary gears 323 are meshed with a lower inner circumference of the gear ring 321, the second sun gear 325 is rotatably installed in a center of an upper of the first planetary gear carrier 324, the three second planetary gears 326 are rotatably installed at a lower of the second planetary gear carrier 327 in a circular array, inner sides of the three second planetary gears 326 are meshed with the second sun gear 325. Outer sides of the three second planetary gears 326 are meshed with an upper inner circumference of the gear ring 321. The second planetary gear carrier 327 is embedded in the second accommodation chamber 2122, and the second planetary gear carrier 327 is meshed with the second accommodation chamber.

A second bearing 3271 is provided between the second planetary gear carrier 327 and the second accommodation chamber 2122; a lower of the main transmission gear shaft 331 is connected to the second planetary gear carrier 327, which is the output end of the aforementioned reduction mechanism 32.

As mentioned above, the reduction mechanism 32 further includes a box body 320, in which the gear ring 321 is embedded. A plurality of first screw hole columns 3201 are provided on an outer circumference wall of the box body 320, a plurality of second screw hole columns 2126 are provided on a lower outer circumference wall of the extension portion 212. Each first screw hole column 3201 corresponds to each second screw hole column 2126 and they are fixedly connected by a screw.

The above is only a preferred embodiment of the present disclosure. When the scope of the present disclosure cannot be limited by this, any simple equivalent changes and modifications made according to the scope of the patent application and the content of the present disclosure still fall within the scope of the present disclosure.

What is claimed is:

1. An electric double-rod grease gun, comprising:
    an oil storage tank, which is stored with grease;
    a plunger pump, which comprises a pump body connected to the oil storage tank; the pump body is provided with a first plunger chamber and a second plunger chamber that are arranged parallely in a horizontal direction and are connected to the oil storage tank; the first plunger chamber is slidably sleeved with a first plunger rod, the second plunger chamber is slidably sleeved with a second plunger rod, the pump body is further provided with an oil outlet nozzle connected to the first plunger chamber and the second plunger chamber;
    a driving device, which comprises a driving motor that drives a main transmission gear to rotate through a reduction mechanism; a first secondary transmission gear and a second secondary transmission gear that are respectively meshed with the main transmission gear, both the first secondary transmission gear and the second secondary transmission gear rotate synchronously with the main transmission gear; a first eccentric shaft and a second eccentric shaft that are respectively eccentrically provided on the first secondary transmission gear and second secondary transmission gear; a first connection rod, where two ends of the first connection rod are movably connected to the first eccentric shaft and the first plunger rod; a second connection rod, where two ends of the second connection rod are movably connected to the second eccentric shaft and the second plunger rod;
    wherein the first connection rod and the second connection rod can respectively drive the first plunger rod and the second plunger rod to perform asynchronous linear reciprocating motion in the corresponding first plunger chamber and the second plunger chamber.

2. The electric double-rod grease gun according to claim 1, wherein the first secondary transmission gear and second secondary transmission gear are symmetrically provided on one side of the main transmission gear away from an axis of the oil storage tank.

3. The electric double-rod grease gun according to claim 2, wherein the first eccentric shaft is eccentrically provided on one side of an upper end face of the first secondary transmission gear, and the second eccentric shaft is eccentrically provided on an upper end face of the second secondary transmission gear and opposite to the first eccentric shaft.

4. The electric double-rod grease gun according to claim 2, wherein the main transmission gear, the first secondary transmission gear, and the second secondary transmission gear are provided on the same horizontal plane.

5. The electric double-rod grease gun according to claim 1, wherein a lower of the pump body is provided with an oil inlet chamber connected to an oil outlet of the oil storage tank, and the first plunger chamber is provided with a first oil inlet connected to the oil inlet chamber; the second plunger chamber is provided with a second oil inlet connected to the oil inlet chamber, the first oil inlet and the second oil inlet are on the same horizontal plane, the first oil inlet and the second oil inlet are also connected via an oil inlet groove that is communicated to the oil inlet chamber.

6. The electric double-rod grease gun according to claim 1, wherein the driving motor, the reduction mechanism, and the main transmission gear are sequentially arranged from bottom to top and are on the same central axis.

7. The electric double-rod grease gun according to claim 1, wherein one end of the first connection rod is provided with a first connecting hole for connection with the first eccentric shaft, and the other end thereof is provided with a first opening groove for connection with the first plunger rod; the first connecting hole is movably wrapped around the first eccentric shaft, the first opening groove is wrapped around an outer of the first plunger rod and connected to the first plunger rod through a first pin shaft.

8. The electric double-rod grease gun according to claim 7, wherein one end of the second connection rod is provided with a second connecting hole for connection with the second eccentric shaft, and the other end thereof is provided with a second opening groove for connection with the second plunger rod; the second connecting hole is wrapped around the second eccentric shaft, the second opening groove is wrapped around an outer of the second plunger rod and connected to the second plunger rod through a second pin shaft.

9. The electric double-rod grease gun according to claim 1, wherein the pump body comprises a main body fixedly connected to the oil storage tank and an extension portion extending from the main body towards a direction of the driving device.

10. The electric double-rod grease gun according to claim 9, wherein a first accommodation chamber with an upward opening is formed in an upper of the extension portion, the main transmission gear, the first secondary transmission gear, and the second secondary transmission gear are respectively provided in the first accommodation chamber, the opening of the first accommodation chamber is provided with a detachable upper cover.

11. The electric double-rod grease gun according to claim 10, wherein a second accommodation chamber with a downward opening is formed in a lower of the extension portion, a communication hole is provided between the second accommodation chamber and the first accommodation chamber; the second accommodation chamber is configured to accommodate an output end of the reduction mechanism, the output end of the reduction mechanism is connected to a main transmission gear shaft; an upper of the main transmission gear shaft passes through the communication hole and extends into the first accommodation chamber to connect with the main transmission gear, a first bearing is provided between the main transmission gear shaft and the communication hole.

12. The electric double-rod grease gun according to claim 11, wherein the first secondary transmission gear and second secondary transmission gear are respectively connected to a first transmission gear shaft and a second transmission gear shaft; a bottom wall of the first accommodation chamber is concavely provided with a first accommodation groove for accommodating the first secondary transmission gear shaft and a second accommodation groove for accommodating the second secondary transmission gear shaft; a first upper bearing and a first lower bearing are provided between the first secondary transmission gear shaft and the first accommodation groove, and a second upper bearing and a second lower bearing are provided between the second secondary transmission gear shaft and the second accommodation groove.

13. The electric double-rod grease gun according to claim 12, wherein the reduction mechanism comprises a gear ring, a first sun gear, three first planetary gears, a first planetary gear carrier, a second sun gear, three second planetary gears, and a second planetary gear carrier; the first sun gear is fixedly connected to an output shaft of the driving motor; the three first planetary gears are rotatably installed at a lower of the first planetary gear carrier in a circular array, inner sides of the three first planetary gears are meshed with the first sun gear, outer sides of the three first planetary gears are meshed with a lower inner circumference of the gear ring; the second sun gear is rotatably installed in a center of an upper of the first planetary gear carrier, the three second planetary gears are rotatably installed at a lower of the second planetary gear carrier in a circular array; inner sides of the three second planetary gears are meshed with the second sun gear, outer sides of the three second planetary gears are meshed with an upper inner circumference of the gear ring; the second planetary gear carrier is embedded in the second accommodation chamber, a second bearing is provided between the second planetary gear carrier and the second accommodation chamber; a lower of the main transmission gear shaft is connected to the second planetary gear carrier.

14. The electric double-rod grease gun according to claim 13, wherein the reduction mechanism further comprises a box body, and the gear ring is embedded in the box body.

15. The electric double-rod grease gun according to claim 14, wherein a plurality of first screw hole columns are provided on an outer circumference wall of the box body, and a plurality of second screw hole columns are provided on a lower outer circumference wall of the extension portion, each first screw hole column corresponds to each second screw hole column and they are fixedly connected by a screw.

* * * * *